United States Patent Office 3,127,284
Patented Mar. 31, 1964

3,127,284
UNIFIED PAPER BACKING FOR USE IN
PRESSURE SENSITIVE TAPES
Moses M. Bailin, St. Laurent, Quebec, Canada, assignor to
Canadian Technical Tape Ltd., St. Laurent, Quebec,
Canada
No Drawing. Filed Dec. 1, 1960, Ser. No. 72,860
11 Claims. (Cl. 117—155)

This invention relates to a normally tacky pressure sensitive adhesive tape or adhesive sheet material formed with a unified paper backing.

A simplified flow diagram of the process of manufacturing such sheet material is as follows:

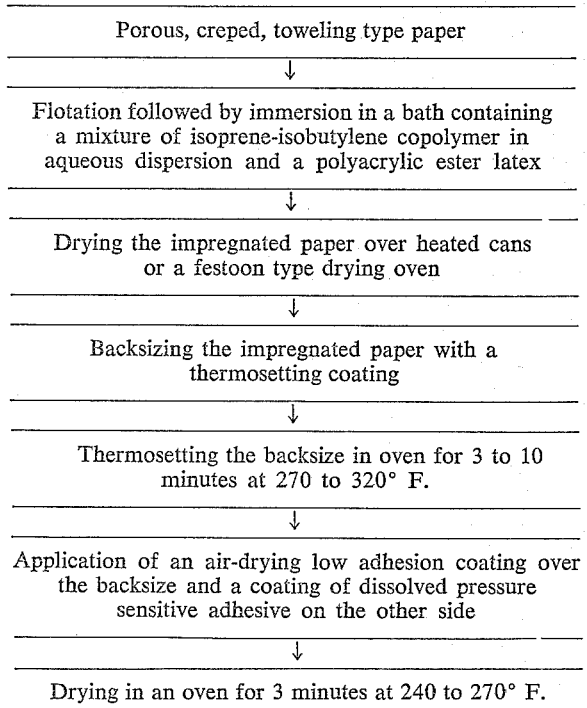

| Porous, creped, toweling type paper |
| --- |
| ↓ |
| Flotation followed by immersion in a bath containing a mixture of isoprene-isobutylene copolymer in aqueous dispersion and a polyacrylic ester latex |
| ↓ |
| Drying the impregnated paper over heated cans or a festoon type drying oven |
| ↓ |
| Backsizing the impregnated paper with a thermosetting coating |
| ↓ |
| Thermosetting the backsize in oven for 3 to 10 minutes at 270 to 320° F. |
| ↓ |
| Application of an air-drying low adhesion coating over the backsize and a coating of dissolved pressure sensitive adhesive on the other side |
| ↓ |
| Drying in an oven for 3 minutes at 240 to 270° F. |

It is highly desirable that impregnated paper used in pressure sensitive tape backings have a combination of properties. These properties are: wet strength, relatively high elongation, dead stretch, tensile strength, resistance to shredding and delamination, softness and conformability, heat resistance, the ability to anchor backsizes customarily used, and resistance to tackifying resin migration from the adhesive into the impregnation.

Though backsizes and adhesives normaly used in paper pressure sensitive tapes afford some protection against the effects of moisture, a high degree of wet strength in the uncoated impregnated paper itself contributes much to ensure that the tape will not delaminate when unwound from the roll under conditions of high humidity. In paper tapes used for paint masking purposes, an impregnated paper backing with high wet strength enables the tape to withstand better the effects of wet sanding.

Relatively high dead stretch, elongation, and tensile strength, together with softness and conformability in impregnated paper backings for pressure sensitive tapes allow the finished tape to be more easily applied around curves and irregular surfaces without tearing or lifting.

Paper masking tapes that are used when such products as automobiles or refrigerators are painted or enameled, may be subjected to baking temperatures ranging from 275° F. to 300° F. for periods of time varying from 45 minutes to two hours. If the impregnated paper backing embrittles excessively, the tape will more readily shred when removed after the operation, thus making the removal of the tape very time consuming.

It is an object of this invention to provide an impregnated paper for use in pressure sensitive tape backings with relatively high tensile strength, dead stretch, ultimate elongation, resistance to delamination and shredding, resistance to tackifying resin migration, and heat resistance, together with a higher degree of wet strength, and softness and conformability, than is found in impregnated paper backings used in commercially available pressure sensitive tapes.

It is a further object of this invention to provide a method for producing paper tape backings with the above properties, which will enable the use of lesser amounts of impregnant than are normally used in paper pressure sensitive tape backings, and which will eliminate the need, under ordinary circumstances, of antioxidants and vulcanizing agents, and which will allow for great compounding and processing simplicity. As a consequence of the advantages of this method and the use of relatively inexpensive materials, a backing with the aforementioned combination of properties can be obtained relatively inexpensively.

Still another object of this invention is to provide for formulating versatility, along with most of the advantages already mentioned. Thus, if a vulcanized impregnated paper backing is desired for any particular reason, such as exceptionally high heat or solvent resistance, aqueous dispersions of a vulcanizing agent such as dipentamethylene thiuran tetrasulfide, an accelerator such as zinc dibutyldithiocarbamate and an activator such as zinc oxide can be added to the impregnant. With these added to the basic materials of the impregnant of this invention, the impregnated paper tape backing can be vulcanized by subjecting it to an adequate heat cure.

Before proceeding to detailed description of the steps involved in the process according to the invention, a glossary of the materials used in the process is given hereunder:

Hycar 2600 x 67 (now known as Hycar 2671).—A latex of an acrylic ester polymer manufactured by the B. F. Goodrich Chem. Co.

Enjay Butyl Latex MD–600 (now known as Enjay Butyl Latex 80–21).—A chemically-stable emulsion in water of the copolymer of isoprene and isobutylene commonly known as "butyl rubber" manufactured by the Enjay Co.

Tetrone A (manufactured by E. I. du Pont de Nemours and Co.).—Di(cyclo) pentamethylenethiuram tetrasulfide. An ultra-accelerator that contains sulfur available for vulcanization. Since additional sulfur is not required for vulcanization it can also be considered a vulcanizing agent.

Merac (manufactured by the Pennsalt Chemicals Co., Philadelphia, Pa.).—Dialkylamine dithiocarbamate (a liquid accelerator which is miscible with water and which causes a minimum of staining in the presence of metallic salts).

*Butyl Zimate (manufactured by the R. T. Vanderbilt Co.).*—Zinc dibutyl dithiocarbamate (an ultra accelerator).

*Ethyl Selenac.*—Selenium diethyl dithiocarbamate.

*Santowhite Crystals (manufactured by the Monsanto Chemical Co.).*—4,4-thiobis-(6-tert-butyl-m-cresol) (an antioxidant).

*Hycar 1561 (manufactured by the B. F. Goodrich Chemical Co.).*—A butadiene-acrylonitrile copolymer latex commonly used in paper masking tape backing impregnants.

*Butaprene NL-300 (manufactured by the Xylos Div. of the Firestone Rubber Co.).*—A butadiene-acrylonitrile copolymer latex used together with Hycar 1561 in current impregnants for paper masking tape backings.

*Aqualized Duracel Crepe (manufactured by the Brown Co.).*—A creped, porous toweling type of paper, commonly used, after impregnation, for masking tape backings.

*"Polyacrylic ester" or acrylic ester polymer.*—A long chain polymer consisting mainly of polymerized methyl or ethyl acrylate or mainly of polymerized methyl and ethyl acrylate.

*Vulcanizing agents.*—Materials which combine chemically with more than one long molecular chain of an elastomeric polymer so that they chemically link the long chains one to another; thus vulcanizing agents produce elastomeric materials that are insoluble, infusible, and that have greatly increased tensile strength. Sulfur, selenium and tellurium are vulcanizing agents. Accelerators such as Tetrone A, which on decomposition, in the presence of heat supply either sulfur or selenium or tellurium, that can be used to vulcanize an elastomer, are considered vulcanizing agents as well as accelerators, since no additional sulfur or other vulcanizing agent is needed.

*Accelerators.*—Materials which speed up the action of vulcanizing agents.

The formulating versatility inherent in this invention is not restricted to the impregnated paper backing, but extends to the design of the entire paper pressure sensitive tape. For example, in the finishing departments of auto manufacturing plants, certain workmen are continuously touching the thermosetting pressure sensitive adhesives of the tapes they work with, and some develop dermatological reactions, caused by the vulcanizing agents and accelerators present in the adhesive. By using the impregnant of this invetnion as a reservoir for these vulcanizing agents and accelerators, and eliminating them in the pressure sensitive adhesive, such dermatological reactions are avoided. During the heat curing of the paint, the vulcanizing agents and accelerators migrate into the pressure sensitive adhesive and vulcanize it; adhesive residue, that usually is left on the masked auto when tapes without vulcanizing adhesives are removed after heat cure of the paint, is not present when the tape described above is used. As another example, there is the problem of formulating thermosetting pressure sensitive adhesives for tapes. Extreme care must be taken of the amounts of the powerful, fast acting vulcanizing agents and accelerators that are included in such adhesives. Excessive amounts result in premature vulcanization of the adhesive during the manufacture of the tape, such as during the drying in a hot oven of spreader coated adhesive solutions on paper tape backings. Such premature vulcanization results in a drastic reduction in the tack of the adhesive. Furthermore, in the use of paper backed tapes with thermosetting adhesives, especially during the thermosetting operation, it is possible for the vulcanizing agents in the adhesive to migrate into the synthetic rubber impregnants that are commonly used in paper tape backings, react with these synthetic rubbers and thus become unavailable for reaction in the thermosetting adhesive. Thus the formulator finds himself greatly restricted in designing paper pressure sensitive tapes with fast-curing thermosetting adhesives. However, in using the impregnant of this invention, the formulator can include a relatively large amount of vulcanizing agents and accelerators in the impregnant, and moderate amounts of the same in the adhesive. Thus he can design tapes that have a great degree of processing safety, while his pressure sensitive adhesive will thermoset more rapidly because of the migration of the vulcanizing agents from the impregnated paper into the adhesive when it is intended to thermoset the adhesive. Since the impregnant of this invention vulcanizes very slowly and only to a limited extent, and since zinc oxide is necessary as an activator for such vulcanization, the impregnated paper backings of this invention in the two examples just given can be vulcanized or unvulcanized as desired.

The formulating versatility just described is based on the fact that the impregnant of this invention has an outstanding combination of properties in the unvulcanized state, on the fact that the impregnant can be vulcanized, and on the fact that it vulcanizes very slowly and only to a desirably limited extent. However, the outstanding combination of properties obtained from the impregnated paper of this invention has been made possible by two amazing discoveries discussed below.

Firstly, the intimate blending of two highly dissimilar and incompatible materials obtained by mixing their solutions together usually results in a blend which after drying contains 2 or more phases, and which has a tensile strength and elongation that is less than the average of the tensile strengths and elongations of the individual components. I have discovered that by using the materials of this invention and by using the method of blending of this invention, I can obtain tensile strengths in impregnated paper that approach very closely the tensile strength of paper impregnated with only the stronger, stiffer material, while I can simultaneously obtain elongation, softness and conformability in the impregnated paper that approach very closely that obtainable in paper impregnated with only the softer, weaker material. Secondly, those experienced in the art have always assumed that the mechanical properties of impregnated papers get progressively worse as the amount of impregnant in the paper is decreased below a weight approximately equal to the weight of the unimpregnated paper. I have discovered that with the materials and methods of this invention it is possible to appreciably reduce the amount of impregnant in the paper, without detracting from tensile strength, elongation and other properties, while the wet tensile strength of the impregnated paper is actually improved. Furthermore, lower than normal pick-ups of impregnant make the tape easier for the user to tear by hand, allow for better anchorage of backsizes and adhesive prime coats, and reduce tendencies that elongated sections of tape applied around curves may have to shrink and pull away from the job when subjected to heat. Thus with the reduction of the amount of impregnant deposited below that normally used, an optimum combination of properties can be obtained at lower cost.

To obtain the objectives of this invention, two normally incompatible materials are intimately blended by mixing together aqueous dispersions of each material and using the mixture to impregnate a saturable paper. These two materials, which normally have little affinity towards one another are a high molecular weight copolymer of isobutylene and a small amount of isoprene, commonly known as butyl, and a high molecular weight acrylic ester linear polymer. A combination of desirable properties thus can be obtained in an impregnated paper tape backing which would be impossible with either polymer used alone, or with other methods of blending.

In accordance with this invention, a porous saturable paper web is impregnated with an anionic aqueous dispersion, the solids of which contain between 25 and 45 percent of a high molecular weight copolymer of isobutylene and a small amount of isoprene and 55 to 75 percent of a high molecular weight linear acrylic ester polymer, the mixed dispersion being obtained by the method described in the preceding paragraph.

Examples of commercially available anionic dispersions of each of the two component materials are Butyl Latex MD-600, manufactured by the Enjay Company (U.S.A.) and Hycar 2600 x 67, an acrylic ester polymer latex, manufactured by the B. F. Goodrich Chemical Company (U.S.A.). The pH of both aqueous dispersions is between 5 and 6 and both are suitable for the practice of this invention. The butyl in the latex given above contains 1.5 to 2 isoprene units per each hundred monomeric units in the molecular chain, the remaining units being isobutylene, though aqueous dispersions of butyls containing 0.6 to 2.5 isoprene units per hundred monomeric units are considered within the scope of this invention. The generally preferred amount of dried impregnant deposited is equal to about 65 percent of the weight of the unimpregnated paper though lesser amounts and greater amounts may be used, depending on the specific requirements of a particular paper backed pressure sensitive tape. Where high heat resistance is important, it is preferable to use an impregnant that contains 25 to 35 percent isoprene-isobutylene copolymer and 65 to 75 percent of the acrylic ester polymer. For exceptionally high heat resistance, it is also preferable to add up to 4 percent of an accelerator such as zinc dibutyldithiocarbamate, or the N,N-dimethylcyclohexylamine salt of dibutyldithiocarbamic acid. These result in a darkening of the impregnant and also in a decrease in the wet tensile strength, but the wet tensile strength will still be more than twice that obtainable with standard butadiene-acrylonitrile copolymer latex impregnations. Thiuram disulfides or thiuram tetrasulfides and zinc oxide can be used with or without thiocarbamates when both high heat resistance and a vulcanized backing are desired. Where an exceptionally high degree of softness, initial tear resistance and dead stretch are desired, it is preferred that the impregnant contain 35 to 45 percent isoprene-isobutylene copolymer and 55 to 65 percent acrylic ester polymer. When a combination of exceptionally high dead stretch, softness, initial tear resistance and exceptionally high heat resistance is desired, it is preferred that the impregnated paper backing contain 35 to 40 parts of isoprene-isobutylene copolymer, 60 to 65 parts of the acrylic ester polymer, up to 4 parts of a thiocarbamate accelerator, and a greater amount of impregnant deposited in the paper than is usually preferred.

In the following examples given to illustrate the practice of this invention, a 30 pound per ream saturable paper, known as Aqualized Duracel Crepe, manufactured by the Brown Company (U.S.A.), was impregnated by floating on the impregnating bath and then immersing in it; excess impregnant was removed by passing the wet web between two rubber squeeze rolls. The impregnated papers were then dried in air circulating ovens for ten minutes at 190° F. and then for ten minutes at 250° F. Other means of drying, such as on heated drums, would be suitable also. Tensile strength and elongations were obtained on a Scott tensile tester, using a four inch jaw spacing, with one inch wide die-cut strips, after the strips were conditioned for 18 hours at 73° F. and 60 percent relative humidity. Wet tensile strength and elongation were obtained with similar strips by testing immediately after exactly 2 minute's immersion in distilled water. Dead stretch, softness and comformablity were evaluated by hand tests as well as by studying the "Tensilgram" recording charts of the Scott tensile tester. Heat resistance was determined by heating impregnated papers for two hours in an air circulating oven at 300° F. and determining the tensile strength and elongation immediately after removal from the oven. The wet weights of the components of the various impregnating baths is given in the examples. Unless otherwise stated, the tests were made on uncoated impregnated paper.

| Example Number | Control | I | II | III | IV |
| --- | --- | --- | --- | --- | --- |
| Butyl Latex MD-600 (55% solids) (parts by wet weight) | | 81.8 | 81.8 | 63.6 | 45.4 |
| Hycar 2600 x 67 (50% solids) (parts by wet weitht) | | 110.0 | 110.0 | 130.0 | 150.0 |
| Hycar 1561 (40% solids) (parts by wet weight) | 263 | | | | |
| Butaprene NL-300 (40% solids) (parts by wet weight) | 27 | | | | |
| Water (parts by weight) | 74 | 26.1 | 58.2 | 56.4 | 54.6 |
| Weight of impregnant (weight percent of unimpregnated paper) | 95 | 94 | 65 | 63 | 69 |
| Percent butyl in the solids of the impregnant | None | 45 | 45 | 35 | 25 |
| Wet tensile strength (lbs. per in. width) | 1.5 | 4.0 | 9.8 | 9.8 | 11.2 |
| Wet elongation (ultimate), percent | 10 | 22 | 20 | 21 | 22 |
| Conditioned tensile strength (lbs. per in. width) | 20 | 18.6 | 20.4 | 20.6 | 21.8 |
| Ultimate elongation, percent | 16 | 21 | 21 | 19 | 18 |
| Softness and conformability (paper as conditioned) | (1) | (2) | (2) | (3) | (3) |
| Dead stretch (paper as conditioned) | (1) | (2) | (2) | (3) | (3) |

NOTE.—Heat resistance test not applied to Examples I–IV.
1 Good.   2 Excellent.   3 Very good.

| Example Number | Control | V | VI | VII | VIII | IX |
| --- | --- | --- | --- | --- | --- | --- |
| Butyl Latex MD-600 (55% solids) (parts by wet weight) | | 54.6 | 45.4 | 72.8 | 54.6 | 63.7 |
| Hycar Latex 2600 x 67 (50% solids) (parts by wet weight) | | 140 | 150 | 120 | 140 | 130 |
| Merac (Sharples Div. of Penn. Salt Co., U.S.A.) (parts by wet weight) | | 4 | | | | |
| Butyl Zimate Dispersion (50% solids) (R. T. Vanderbilt Co., U.S.A.) (parts by wet weight) | | | | | | 2 |
| Tetrone A Dispersion (50% solids) (E. I. du Pont de Nem. Co.) (parts by wet weight) | | | | | 4 | |
| Zinc Oxide Dispersion NX585C (53% solids) (Naugatuck Chem. Co.) (parts by wet weight) | | | | | 10 | |
| Water (parts by weight) | 74 | 23.4 | 54.6 | 25.2 | 23.4 | 24.3 |
| Hycar 1561 (40% solids) (parts by wet weight) | 263 | | | | | |
| Butaprene NL-300 (44% solids) (parts by wet weight) | 27 | | | | | |
| Santowhite Crystals Dispersion (25% solids) (Naugatuck Chem. Co.) (parts by wet weight) | 0.5 | | | | | |
| Amount of impregnant (weight percent of unimpregnated paper) | 100 | 94 | 69 | 97 | 87 | 84 |
| Wet tensile strength (lbs. per in. width) | 1.5 | 5 | 11.3 | 7 | 7 | 10.2 |
| Dead stretch, softness and conformability | (1) | (2) | (3) | (2) | (3) | (3) |
| Initial tensile strength (lbs. per in. width after conditioning before heat test) | 21 | 21 | 22.3 | 21.4 | 21.8 | 21.6 |
| Initial elongation (after conditioning, before heat test), percent | 13 | 21.5 | 18 | 23 | 20 | 21.5 |
| Elongation immediately after heat resistance test (2 hrs. at 300° F.), percent | 6.5 | 15 | 13 | 12 | 13.5 | 13 |
| Tensile strength immediately after heat resistance test (pounds per inch width) | 17.7 | 18.3 | 15.8 | 14.2 | 17 | 16.8 |

1 Good.   2 Excellent.   3 Very good.

*Example X*

An impregnating bath was used to impregnate, on an industrial scale, a 30 pound per ream 40 inch wide jumbo roll of Brown Company Aqualized Duracel Crepe, in the manner above described so as to deposit an amount of dried impregnant equal to about 88 percent of the weight of the unimpregnated paper. The bath had the following composition:

Wet weights, parts
Butyl Latex MD-600 (55% solids) _____ 45.5
Hycar 2600 x 67 (50% solids) _____ 150
Water _____ 22.5

A thousand yards of this impregnated paper was then backsized on one side with a standard backsize commonly used on masking tapes; the amount of dry backsize applied was about 6 pounds per ream and it was cured for 10 minutes at 280° F. A commonly used neoprene latex-resin emulsion type adhesive tie coat then was applied to the uncoated side, to the extent of 4 pounds of dry tie coat per 24" x 36" ream of paper. Subsequently, an immeasurable amount of a low adhesion coating was applied over the backsize and about 42 pounds per ream of a standard high temperature thermosetting pressure sensitive adhesive was applied over the tie coat. The finished jumbo roll was then slit into tape rolls of various widths.

The uncoated impregnated paper, after conditioning at 73° F. and 60 percent relative humidity for eighteen hours, had a tensile strength of 23 pounds per inch width and an elongation of about 20 percent. The finished tape after one month on the shelf had a tensile strength of about 28 pounds per inch width and an elongation of about 13 percent.

A strip of this finished tape was heated in an air circulating oven for two hours at 300° F.; the tensile strength, immediately after it was removed from the oven was about 21.8 lbs. and the elongation was about 6½ percent. Similar tape, using a standard butadiene-acrylonitrile impregnated paper backing, had a tensile strength of 17 pounds per inch width after the same test. After accelerated aging overnight at 150° F. and 85 percent relative humidity, no noticeable drop in tack occurred. The tape of this example was tested by using it in an automobile manufacturing plant for paint masking purposes and it proved to be satisfactory.

*Example XI*

30 lbs. per ream Aqualized Duracel Crepe paper from the Brown Company was floated on a bath, then immersed in the bath, and then passed through squeeze rolls to remove excess impregnant; an amount of dried impregnant equal to 67% of the weight of the unimpregnated paper was deposited. The impregnating bath had the following composition:

| | Wet weights |
|---|---|
| Butyl Latex MD-600 (55% solids) | 63.7 |
| Hycar Latex 2600 x 67 (50% solids) | 130 |
| Butyl zimate dispersion (50% solids) | 2 |
| Water | 114 |

This bath was used for impregnation within twenty four hours after adding the butyl zimate dispersion so that the formation of dark colored salts would be kept to a minimum. The impregnated paper was dried in an air circulating oven for 10 minutes at 200° F. and then for 10 minutes at 265° F. After conditioning for 24 hours at 72° F. and 50% relative humidity the tensile strength was 19.5 pounds per inch width and the elongation was 22 percent. A sample of this uncoated impregnated paper was then placed in an air circulating oven at 300° F. for two hours; immediately after removal from the oven it had a tensile strength of 16 lbs. per inch width and an elongation of 15 percent.

After backsizing, four pounds per ream of prime coat was applied to the uncoated side of the impregnated paper. The prime coat had the following dry composition:

| | Dry weights |
|---|---|
| "Butyl 165" (Enjay Co.) | 60 |
| Pale crepe natural rubber | 40 |
| Piccopate 100 (Penn. Industrial Chem. Corp.) | 102 |
| Piccolyte S-115 Resin (Penn. Industrial Chem. Corp.) | 42 |
| SP-103 Resin (Schenectady Varnish Co.) | 18 |
| Zirex Resin (Newport Industries) | 2 |
| Ethyl Selenac (R.T. Vanderbilt) | 1.5 |
| Butyl zimate | 4.5 |
| Zinc oxide | 20 |

The above materials were dispersed in toluol to make a 20 percent solids solution.

The primed side of the impregnated paper was then coated with 40 pounds per ream of a natural rubber based adhesive that is used in a commercial masking tape. The adhesive is one that tends to leave residue when the tape is subjected to certain heating cycles and then removed while still hot after use. Strips of the primed and adhesive coated impregnated paper were then applied to polished chrome-plated steel panels along with the commercial masking tape that bore the same adhesive. They were then subjected to 30 minute, and 45 minute bakes at 190° F. and 245° F. When the tapes were removed from the panel while still hot, the experimental tape of this example left no residue while the commercial masking tape with the same adhesive left residue.

The invention has been presented in this disclosure in those forms in which it will most usually be preferred. However, this disclosure is not to be construed as limiting the invention, as many variations for specialized tape applications will be obvious to those experienced in the art. For example, for some tape applications cost may be the most important factor and an amount of dried impregnant as little as 20 percent of the weight of the impregnated paper might be used. As another example, softness, dead stretch, elongation, and conformability may be very important while tensile strength may be of little importance and in those cases the impregnant may contain 65 percent or more of the copolymer of isobutylene and a small amount of isoprene, commonly known as butyl. Or as another example, for such products as a carton-sealing tape, a kraft paper or a rope paper may be preferred. It therefore should be understood that this invention is only limited by the appended claims.

What I claim is:

1. A unified paper backing for use in pressure sensitive adhesive tapes, impregnated with an internal bonding agent comprising a high molecular weight copolymer of isobutylene and a small amount of isoprene, and a polymer consisting substantially of a high molecular weight addition product selected from the group consisting of polymethyl acrylate, polyethyl acrylate and copolymers of methyl and ethyl acrylate.

2. A unified paper backing according to claim 1 in which the copolymer of isobutylene and a small amount of isoprene constitute 25 to 65 percent by weight of the internal bonding agent, and the internal bonding agent is present in an amount between 20 percent and 110 percent of the weight of the unimpregnated paper.

3. An unvulcanized unified paper backing according to claim 1 wherein at least one aqueous dispersion selected from the group consisting of an aqueous dispersion of a rubber vulcanizing accelerator and an aqueous dispersion of a vulcanizing agent is added to the bonding agent.

4. A vulcanized unified backing according to claim 1 wherein zinc oxide, at least one rubber vulcanizing accelerator, and 0.1-20 parts by weight per 100 parts by weight of said isoprene-isobutylene copolymer, of at least one vulcanizing agent are added to the bonding agent.

5. A unified paper backing according to claim 1 for use in masking tapes in which the isoprene-isobutylene copolymer constitutes between 25 percent and 40 percent of the internal bonding agent and the internal bonding agent is present in an amount between 60 percent and 88 percent of the weight of the unimpregnated paper.

6. An unvulcanized, unified paper backing according to claim 5, where at least one aqueous dispersion selected from the group consisting of an aqueous dispersion of a rubber vulcanizing accelerator and an aqueous dispersion of a vulcanizing agent is added to the bonding agent.

7. A vulcanized, unified paper backing according to claim 5 wherein zinc oxide, at least one rubber vulcanizing accelerator, and 0.1-20 parts by weight per 100 parts by weight of said isoprene-isobutylene copolymer, of at least one vulcanizing agent are added to the bonding agent.

8. A process of producing a unified paper backing for use in pressure sensitive tapes, which comprises mixing together an anionic aqueous dispersion of a high molecular weight copolymer of isobutylene and a small amount of isoprene, and an anionic aqueous dispersion of a polymer consisting substantially of a high molecular weight addition product selected from the group consisting of a polymethyl acrylate, polyethyl acrylate and copolymers of methyl and ethyl acrylate, to form an intimate mixture of said two normally incompatible compounds, and impregnating a paper backing with said mixture.

9. A process according to claim 8, wherein at least one aqueous dispersion selected from the group consisting of an aqueous dispersion of a rubber vulcanizing accelerator and an aqueous dispersion of a vulcanizing agent is added to said mixture.

10. A process according to claim 8, wherein an aqueous dispersion of zinc oxide, and aqueous dispersions of at least one rubber vulcanizing accelerator and aqueous dispersions of at least one vulcanizing agent are added to said mixture said vulcanizing agent being added in an amount of 0.1–20 parts dry weight per 100 parts dry weight of said isoprene-isobutylene copolymer, the said zinc oxide, accelerator and vulcanizing agent being in aqueous dispersions selected among anionic aqueous dispersions and non-ionic aqueous dispersions.

11. A process according to claim 8, wherein aqueous dispersions of zinc oxide, accelerators and vulcanizing agents are added to said mixture in the exact quantities required to cause vulcanization of the impregnation, the said zinc oxide, accelerator and vulcanizing agent being in aqueous dispersions selected among anionic aqueous dispersions and non-ionic aqueous dispersions.

References Cited in the file of this patent
UNITED STATES PATENTS

| | | |
|---|---|---|
| 2,410,078 | Kellgren | Oct. 29, 1946 |
| 2,438,195 | Tierney | Mar. 23, 1948 |
| 2,551,600 | Holland et al. | May 8, 1951 |
| 2,955,958 | Brown | Oct. 11, 1960 |